US010632834B2

(12) United States Patent
Hoffmann et al.

(10) Patent No.: US 10,632,834 B2
(45) Date of Patent: Apr. 28, 2020

(54) DRIVE DEVICE FOR A MOTOR VEHICLE, MOTOR VEHICLE HAVING A DRIVE DEVICE, AND METHOD FOR OPERATING A DRIVE DEVICE

(71) Applicant: AUDI AG, Ingolstadt (DE)

(72) Inventors: Thomas Hoffmann, Riedenburg (DE); Markus Störmer, Berching (DE); Karl Jägle, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 411 days.

(21) Appl. No.: 15/639,271

(22) Filed: Jun. 30, 2017

(65) Prior Publication Data

US 2018/0001759 A1    Jan. 4, 2018

(30) Foreign Application Priority Data

Jul. 2, 2016  (DE) .................. 10 2016 008 167

(51) Int. Cl.
*B60K 6/48* (2007.10)
*B60K 17/356* (2006.01)
(Continued)

(52) U.S. Cl.
CPC .................. *B60K 6/48* (2013.01); *B60K 1/00* (2013.01); *B60K 6/365* (2013.01); *B60K 6/52* (2013.01);
(Continued)

(58) Field of Classification Search
CPC ...... B60K 17/354; B60K 17/356; B60K 1/00; B60K 2001/001; B60K 6/365; B60K 6/48;
(Continued)

(56) References Cited

U.S. PATENT DOCUMENTS

| 5,669,842 A | 9/1997 | Schmidt |
| 2002/0023790 A1* | 2/2002 | Hata ................. B60K 6/40 |
| | | 180/65.225 |

(Continued)

FOREIGN PATENT DOCUMENTS

| CN | 101000084 A | 7/2007 |
| CN | 100419310 C | 9/2008 |

(Continued)

OTHER PUBLICATIONS

Examination Report dated Feb. 27, 2017 of corresponding German application No. 102016008167.8; 10 pgs.

(Continued)

*Primary Examiner* — Jacob S. Scott
(74) *Attorney, Agent, or Firm* — Maier & Maier, PLLC

(57) ABSTRACT

A drive device for a motor vehicle having a first drive assembly, a second drive assembly, and a planetary gear unit, via which the first drive assembly and the second drive assembly are operatively connected to a drivable axle of the motor vehicle. The first drive assembly and the drivable axle are operatively connected to the planetary gear unit. The second drive assembly as well as an auxiliary drive having an auxiliary assembly are operatively connected permanently to the planetary gear unit. The auxiliary drive has a third drive assembly, which is coupled at least intermittently to the auxiliary assembly.

6 Claims, 1 Drawing Sheet

(51) Int. Cl.
    *B60K 17/354* (2006.01)
    *B60K 6/365* (2007.10)
    *B60K 6/52* (2007.10)
    *B60K 1/00* (2006.01)

(52) U.S. Cl.
    CPC .......... *B60K 17/354* (2013.01); *B60K 17/356* (2013.01); *B60K 2001/001* (2013.01); *B60Y 2200/92* (2013.01); *B60Y 2400/732* (2013.01); *B60Y 2400/82* (2013.01); *Y02T 10/6221* (2013.01); *Y10S 903/91* (2013.01); *Y10S 903/951* (2013.01)

(58) Field of Classification Search
    CPC ............................ B60K 6/52; B60Y 2200/92; B60Y 2400/732; B60Y 2400/82; Y02T 10/6221; Y10S 903/91; Y10S 903/951
    See application file for complete search history.

(56) References Cited

U.S. PATENT DOCUMENTS

| | | | |
|---|---|---|---|
| 2006/0025260 A1* | 2/2006 | Klemen | B60K 6/365 475/5 |
| 2007/0145749 A1 | 6/2007 | Holmes et al. | |
| 2009/0314559 A1 | 12/2009 | Palitto | |
| 2010/0222171 A1* | 9/2010 | Tabata | B60L 50/16 475/5 |
| 2013/0255440 A1 | 10/2013 | Blond et al. | |
| 2015/0240917 A1* | 8/2015 | Vermeulen | B60K 6/365 475/5 |
| 2015/0367719 A1 | 12/2015 | Blasinski et al. | |
| 2017/0361696 A1* | 12/2017 | Davydov | B60K 6/36 |

FOREIGN PATENT DOCUMENTS

| | | |
|---|---|---|
| CN | 104955697 A | 9/2015 |
| CN | 105593046 A | 5/2016 |
| DE | 102005035403 A1 | 3/2006 |
| DE | 102006037576 A1 | 4/2008 |
| DE | 102008060972 A1 | 6/2010 |
| DE | 102009029119 A1 | 3/2011 |
| DE | 102012205142 A1 | 10/2013 |
| DE | 102014101733 A1 | 8/2014 |
| EP | 2655116 A1 | 10/2013 |
| EP | 2365915 B1 | 1/2016 |
| WO | 2012/085613 A1 | 6/2012 |

OTHER PUBLICATIONS

Office Action dated Jul. 22, 2019, in corresponding Chinese Application No. 201710521819.6 including partial machine-generated English language translation; 11 pages.

Chinese Office Action dated Jan. 19, 2020, in connection with corresponding CN Application No. 201710521819.6 (17 pages, including machine-generated English translation).

* cited by examiner

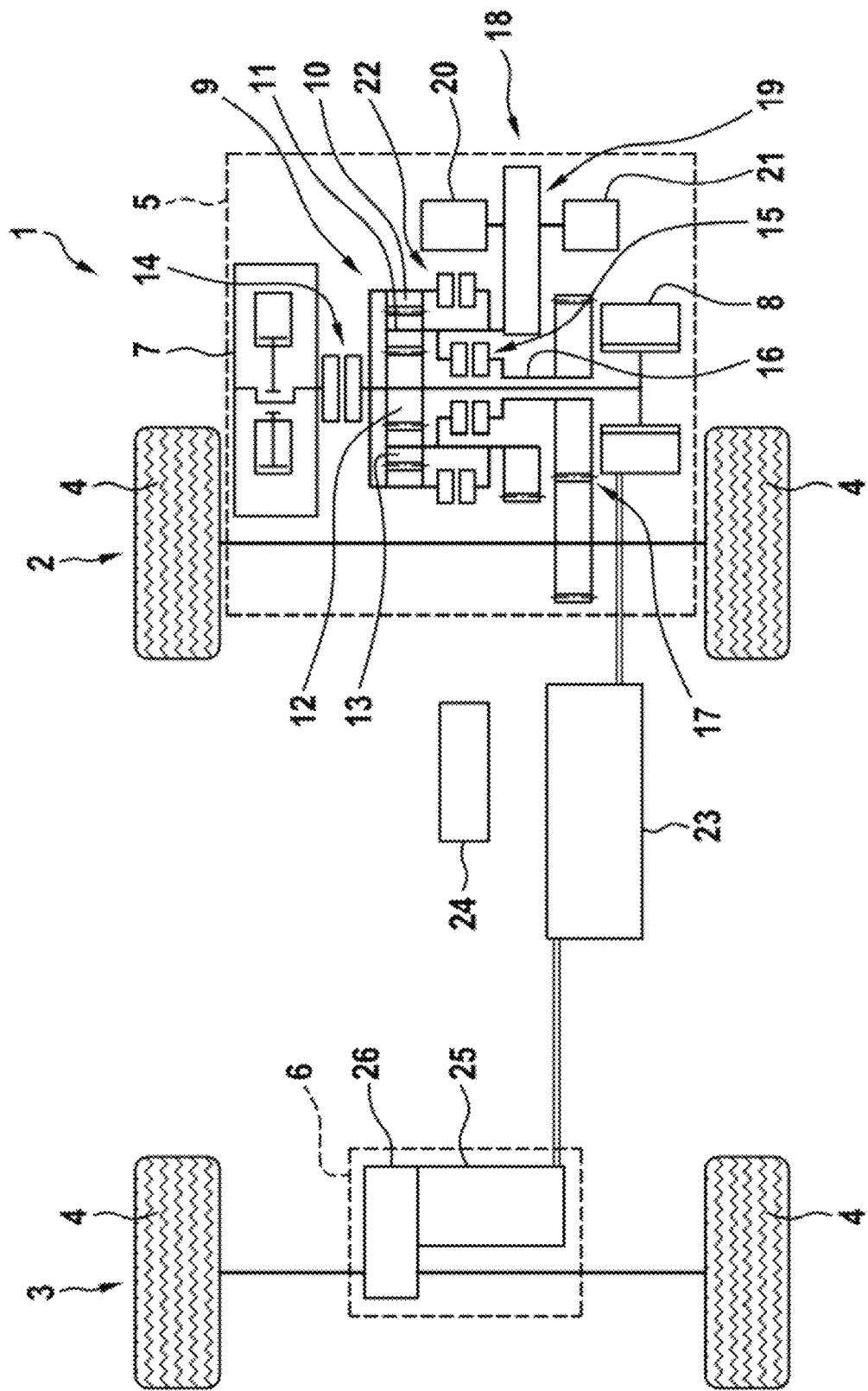

DRIVE DEVICE FOR A MOTOR VEHICLE, MOTOR VEHICLE HAVING A DRIVE DEVICE, AND METHOD FOR OPERATING A DRIVE DEVICE

FIELD

The invention relates to a drive device for a motor vehicle, with a first drive assembly, a second drive assembly, and a planetary gear unit, via which the first drive assembly and the second drive assembly can be operatively connected to a drivable axle of the motor vehicle. The invention further relates to a motor vehicle having a drive device as well as to a method for operating a drive device.

BACKGROUND

The drive device serves for driving the motor vehicle and insofar therefore for supplying a torque directed at driving the motor vehicle. The drive device comprises the first drive assembly, the second drive assembly, and the planetary gear unit. The two drive assemblies can fundamentally be designed in any way. For example, the first drive assembly exists in the form of an internal combustion engine and the second drive assembly exists in the form of an electric engine, so that the drive device is designed as a hybrid drive device.

The two drive assemblies—namely, the first drive assembly and the second drive assembly—can be operatively connected via the planetary gear unit to the drivable axle of the motor vehicle. This means that the drivable axle of the motor vehicle can be driven either solely by means of the first drive assembly, solely by means of the second drive assembly, or else by both the first and the second drive assembly. At least one wheel of the motor vehicle is provided at the drivable axle and can be driven by means of the drive device. Preferably, however, a plurality of wheels are associated with the axle, each of which can be driven by the drive device.

SUMMARY

The object of the invention is to propose a drive device for a motor vehicle, which, in comparison to known drive devices, has advantages, in particular a high energy efficiency as well as a high flexibility.

It is thereby provided that the first drive assembly and the drivable axle can be operatively connected or are operatively connected to the planetary gear unit and that the second drive assembly as well as an auxiliary drive having an auxiliary assembly are operatively connected permanently to the planetary gear unit, wherein the auxiliary drive has a third drive assembly, which is coupled at least intermittently to the auxiliary assembly.

For example, the first drive assembly and the drivable axle can each be operatively connected to the planetary gear unit, for example by way of a shift clutch. Alternatively, the first drive assembly and/or the drivable axle can be operatively connected permanently to the planetary gear unit or are/is permanently coupled to it. This is understood to mean that the first drive assembly and/or the drivable axle are/is coupled permanently to an element of the planetary gear unit in a rotation-resistant manner, in particular rigidly.

The second drive assembly is operatively connected permanently at all times to the planetary gear unit. This means that it is coupled rigidly to the planetary gear unit and hence, in particular, no shift clutch is present between it and the planetary gear unit. The auxiliary drive or the auxiliary assembly can likewise be connected rigidly at the planetary gear unit or alternatively, via a shiftable or variable gear ratio. For example, the auxiliary drive itself has at least one shift element, by means of which the auxiliary assembly is optionally coupled to the planetary gear unit or decoupled from it. The auxiliary drive is preferably linked at a driven element of the planetary gear unit, although a linkage at other elements of the planetary gear unit is also possible. The linkage of the second drive assembly and/or the auxiliary drive at the planetary gear unit can be provided directly or indirectly via another transmission, for example a toothed gear unit. Especially preferred, the second drive assembly is operatively connected permanently and directly to the planetary gear unit, whereas the auxiliary assembly is operatively connected via the additional gear unit permanently, but only indirectly to the planetary gear unit.

The auxiliary drive comprises the auxiliary assembly as well as the third drive assembly. The third drive assembly exists, for example, in the form of an electric engine. The third drive assembly is then coupled at least intermittently to the auxiliary assembly and hence is connected to it in a rotation-resistant manner. To this end, for example, a shift clutch is provided between the third drive assembly, wherein the auxiliary assembly, wherein, in a first shift position of the shift clutch, the third drive assembly is coupled to the auxiliary assembly and, in a second shift position, is preferably completely decoupled from it.

Insofar as it is a question of having the auxiliary drive operatively connected permanently to the planetary gear unit, this applies either to the third drive assembly, the auxiliary assembly, or both of them. Hence, it can be provided, for example, that the planetary gear unit is coupled permanently to the third drive assembly, whereas the auxiliary assembly can be decoupled from the third drive assembly and consequently from the planetary gear unit, in particular by means of the mentioned shift clutch.

Conversely, it is obviously possible for the planetary gear unit to be coupled permanently to the auxiliary assembly and for it to be possible to decouple the third drive assembly from the auxiliary assembly and consequently from the planetary gear unit, again preferably by way of the shift clutch. Likewise, it can be provided that both the third drive assembly and the auxiliary assembly are coupled permanently to each other and to the planetary gear unit.

The planetary gear unit has at least one planetary gear set, in particular exactly one planetary gear set or a plurality of planetary gear sets. In the latter case, the planetary gear unit may also be referred as a multiple-stage planetary gear unit or as a mechanical planetary gear unit. Such a multiple-stage planetary gear unit exists, for example, in the form of a Ravigneaux gear set or a Lepelletier gearbox.

The drive device or the elements associated with it, in particular the first drive assembly, the second drive assembly, the auxiliary drive including the auxiliary assembly and the third drive assembly, as well as the planetary gear unit, is or are preferably arranged in a common installation space or even in a common engine case. In this way, it is possible to create a greater functional scope, given a relatively small installation space, because the drive device is very compact. The auxiliary assembly is, for example, a turbomachine, in particular a compressor, especially preferred an air-conditioner compressor. The latter serves for example, for air conditioning of the interior compartment of a motor vehicle, in particular a passenger compartment of the motor vehicle.

The described design of the drive device is especially advantageous in the case that the first drive assembly is designed as an internal combustion engine and the second drive assembly is designed as an electric engine. Thus, a higher drag torque results for the internal combustion engine than for the electric engine. In the ideal case, it may even be assumed that the drag torque of the electric engine is virtually zero. Accordingly, it is appropriate for reasons of energy efficiency of the drive device to design the internal combustion engine in the form of the first drive assembly so that it can be decoupled from the planetary gear unit, for which purpose, for example, a first shift clutch is provided. The second drive assembly in the form of the electric engine can, in contrast, be operatively connected permanently to the planetary gear unit, without this having a detrimental effect on the efficiency.

The association of the third drive assembly with the auxiliary drive offers the advantage that, for example, the auxiliary assembly can be driven solely by means of the third drive assembly and hence without use of the first drive assembly and/or the second drive assembly. It can also be provided that the first drive assembly, in particular in the case that it is designed as an internal combustion engine, is started by means of the auxiliary drive or the third drive assembly associated with it. This means that the first drive assembly is dragged by way of the third drive assembly to a minimum rotational speed.

In this regard, an external torque is supplied by the third drive assembly and applied at the first drive assembly, so that the rotational speed of the first drive assembly is increased in the direction of the minimum rotational speed. The minimum rotational speed of the first drive assembly is understood here to be a rotational speed above which the first drive assembly is operated even without the external torque and therefore automatically, and, in particular, it can be accelerated further in the direction of higher rotational speeds.

Preferably, the third drive assembly is designed to be smaller, in particular in regard to its power and consequently also its structural size, than the first drive assembly and/or the second drive assembly. Preferably, the maximum power of the third drive assembly is at most 5%, at most 10%, at most 15%, at most 20%, or at most 25% of the maximum power of the second drive assembly. Especially preferred, in the case that both the second drive assembly and the third drive assembly are designed as electric machines, the third drive assembly can be operated with the same voltage as the second drive assembly. To this end, for example, the second drive assembly and the third drive assembly are connected at a high-voltage on-board power supply of the motor vehicle. The voltage level of the third drive assembly thus corresponds preferably to that of the second drive assembly. However, it is also possible to bring about different voltage levels.

Another preferred design of the invention provides that the first drive assembly can be operatively connected to the planetary gear unit via a first shift clutch and the drivable axle via a second shift clutch. The first shift clutch and the second shift clutch can each be present in at least two shift positions, namely, in a first shift position, in which it is completely open or disengaged, so that no torque is transmitted by it, and in a second shift position, in which it is closed or engaged at least partially and, in particular, is completely engaged, so that a torque, in particular the entire torque applied at the shift clutch, is transmitted via the respective shift clutch. Especially preferred, the first shift clutch and the second shift clutch are each completely engaged in their second shift position, so that, in this case, the first drive assembly or the drivable axle is coupled essentially rigidly to the planetary gear unit.

In this regard, the first drive assembly and the drivable axle can be decoupled completely from the planetary gear unit, so that the respective operative connection between them and the planetary gear unit is disengaged. By way of appropriate adjustment of the shift clutches, it is therefore possible optionally to produce and disengage the operative connection between the first drive assembly and the planetary gear unit, on the one hand, and the operative connection between the drivable axle and the planetary gear unit, on the other hand. Especially preferred, the first shift clutch and the second shift clutch are arranged in the common installation space or in the common engine case of the drive device.

By way of appropriate adjustment of the first shift clutch, it is possible to bring about on the planetary gear unit a torque solely from the first drive assembly, solely from the second drive assembly, or jointly from both drive assemblies, with it being possible for this torque to be positive or negative. A positive torque is understood here to be a torque that is directed at an acceleration of at least one element of the planetary gear unit and/or drivable axle, whereas a negative torque is understood to be a torque that brings about a delay, that is, a reduction of a rotational speed.

The torque applied on the planetary gear unit can then—in the case of an at least partially engaged second shift clutch— be supplied at least partially to the drivable axle. In addition, a portion of the torque can be used for operating the auxiliary drive, that is, the auxiliary assembly and/or the third drive assembly. If, in contrast, the second shift clutch is completely disengaged, then the operative connection between the planetary gear unit and the drivable axle is disengaged. In this case, for example, the applied torque can serve for operating the auxiliary drive or for producing electric energy by means of the second drive assembly, designed as an electric engine. In the latter case, the second drive assembly is driven by the first drive assembly via the planetary gear unit. Likewise, it can obviously be provided that the third drive assembly is operated as a generator and is driven by means of the first drive assembly.

Another design of the invention provides that the first drive assembly can be operatively connected via the first shift clutch to a ring gear of the planetary gear unit. The operative connection of the first drive assembly to the ring gear can exist rigidly and directly when the first shift clutch is engaged. This means that, when the first shift clutch is engaged, the ring gear of the planetary gear unit has the same rotational speed as the first drive assembly.

A preferred enhancement of the invention provides that the drivable axle can be operatively connected via the second shift clutch to a planetary gear carrier of the planetary gear unit, with at least one planetary gear being mounted rotatably on the planetary gear carrier and meshing, on the one hand, with the ring gear, and on the other hand, with a sun gear of the planetary gear unit. For example, an intermediate shaft is provided, which is operatively connected to the drivable axle rigidly and permanently, for example, via a gear unit or a gear stage.

The intermediate shaft can then be operatively connected via the second shift clutch to the planetary gear carrier of the planetary gear unit and, in particular, it can be operatively connected directly and rigidly. Analogously to the preceding designs, this means that, when the second shift clutch is engaged, the intermediate shaft has the same rotational speed as that of the planetary gear carrier. Obviously, the drivable axle can also be operatively connected directly, that is, without the intermediate shaft, to the planetary gear carrier.

The planetary gear unit has a conventional design; that is, it comprises the ring gear, the planetary gear carrier, and the sun gear. Mounted in a rotatable manner on the planetary gear carrier is the at least one planetary gear, with preferably a plurality of planetary gears being mounted on the planetary gear carrier. The planetary gear or the planetary gears meshes or mesh, on the one hand, with the ring gear and, on the other hand, with the sun gear.

In the scope of another design of the invention, it can be provided that the second drive assembly is operatively connected to the sun gear of the planetary gear unit. The operative connection between the second drive assembly and the sun gear is preferably rigid and direct. This means that the sun gear has, at all times, the same rotational speed as the second drive assembly, and vice versa.

An enhancement of the invention provides that the auxiliary drive is operatively connected to the planetary gear carrier. The operative connection between the auxiliary drive and the planetary carrier is usually rigid and permanent. Whereas the auxiliary drive can be operatively connected directly to the planetary carrier, there is preferably an indirect operative connection via a gear unit or a gear stage. The auxiliary drive is therefore operatively connected via this transmission rigidly and permanently to the planetary gear carrier, so that the rotational speed of the auxiliary drive has, at all times, a specific ratio to the rotational speed of the planetary gear carrier.

It is noted once again that the permanent operative connection between the planetary gear unit and consequently the planetary gear carrier, on the one hand, and the auxiliary drive, on the other hand, can be understood to mean a permanent operative connection between the planetary transmission and the third drive assembly and/or the auxiliary assembly, so that the third drive assembly or the auxiliary assembly can also be decoupled from the planetary gear unit, for example, by way of a corresponding shift clutch.

Another preferred embodiment of the invention provides that, by means of a third shift clutch, the planetary gear carrier can be fixed in relation to the ring gear. The third shift clutch can also have at least two shift positions for the first shift clutch and the second shift clutch in analogy to the preceding designs, namely, the first shift position, in which it is completely disengaged, and the second shift position, in which it is at least partially and, in particular, completely engaged. Especially preferred, therefore, the planetary gear carrier is completely fixed in relation to the ring gear or the planetary gear carrier is rigidly coupled to the ring gear when the third shift clutch is engaged.

The invention further relates to a motor vehicle with a drive device, in particular with a drive device according to the preceding designs, wherein the drive device comprises a first drive assembly, a second drive assembly, and a planetary gear unit, via which the first drive assembly and the second drive assembly can be operatively connected to a drivable axle of the motor vehicle. It is provided here that the first drive assembly and the drivable axle can be operatively connected or are operatively connected to the planetary gear unit and that the second drive assembly as well as an auxiliary drive having an auxiliary assembly are operatively connected permanently to the planetary gear unit, wherein the auxiliary drive has a third drive assembly, which is coupled at least intermittently to the auxiliary assembly.

The advantages of such a design of the motor vehicle as well as of the drive device have already been noted. Both the motor vehicle and the drive device can be developed further in accordance with the preceding designs, so that reference to said designs is made in this regard.

It can be provided in another design of the invention that another drive assembly can be operatively connected or is operatively connected to another drivable axle of the motor vehicle. The additional drive assembly is, for example, an electric engine. Said electric engine is coupled to or can be coupled to the additional drivable axle, which differs from the drivable axle described above. The operative connection between the additional drive assembly and the additional drivable axle can be provided directly, so that the additional drivable axle also has, at all times, the same rotational speed as the additional drive assembly. Obviously, however, it is possible to provide a transmission between the additional drive assembly and the additional drivable axle; that is, the operative connection therefore exists only indirectly.

Finally, the invention relates to a method for operating a drive device, in particular a drive device according to the preceding designs, wherein the drive device comprises a first drive assembly, a second drive assembly, and a planetary gear unit, via which the first drive assembly and the second drive assembly can be operatively connected to a drivable axle of the motor vehicle. It is provided here that the first drive assembly and the drivable axle are operatively connected to or can be operatively connected to the planetary gear unit and that the second drive assembly as well as an auxiliary drive having an auxiliary assembly are operatively connected permanently to the planetary gear unit, wherein the auxiliary drive has a third drive assembly, which is coupled at least intermittently to the auxiliary assembly.

Reference is made once again to the preceding designs, in accordance with which the drive device as well as the method for the operation thereof can be further developed or enhanced.

BRIEF DESCRIPTION

The invention will be explained in detail below on the basis of the exemplary embodiments illustrated in the drawing, without any limitation of the invention thereby ensuing.

The FIGURE shows a schematic illustration of a motor vehicle having a drive device.

DETAILED DESCRIPTION

The FIGURE shows a schematic illustration of a motor vehicle 1 with two axles 2 and 3, with a plurality of wheels 4 being associated with each of the axles 2 and 3. The two axles 2 and 3 are designed as drivable axles. For this purpose, the axle 2 is associated with a drive device 5, whereas another drive device 6 is provided at the second axle 3. The drive device 5 provides a first drive assembly 7, a second drive assembly 8, and a planetary gear unit 9. Via the planetary gear unit 9, the drive assemblies 7 and 8 can be operatively connected to the axle 2 and accordingly to the wheels 4 thereof.

The planetary gear unit 9 comprises a ring gear 10, a planetary gear carrier 11, and a sun gear 12. Mounted rotatably at planetary gear carrier 11 is at least one planetary gear 13, which, on the one hand, meshes with the ring gear 10 and, on the other hand, meshes with the sun gear 12. Via a first shift clutch 14, the ring gear 10 can be operatively connected to the first drive assembly 7. The first shift clutch 14 can thereby have at least two shift positions, namely, a first shift position, in which it is completely disengaged and therefore does not transmit any torque, and a second shift position, in which it is partially engaged and, in particular, is completely engaged, so that a torque is transmitted between the first drive assembly 7 and the planetary gear unit 9, in particular, the ring gear 10.

Provided in addition to the first shift clutch 14 is a second shift clutch 15, via which the planetary gear unit 9, in particular the planetary gear carrier 11, can be operatively connected to the axle 2. In particular, by means of the second shift clutch 15, an operative connection between the planetary gear carrier 11 and an intermediate shaft 16 is optionally produced or disengaged. The intermediate shaft 16, in turn, is operatively connected rigidly and permanently to the axle 2 or to the wheels 4 thereof, for example via a gear stage 17. Finally, the second drive assembly 8 is operatively connected rigidly and permanently to the sun gear 12.

Furthermore, the drive device 5 has an auxiliary drive 18. Said auxiliary drive is operatively connected, preferably rigidly and permanently, to the planetary gear carrier 11. This operative connection can be direct, so that the auxiliary drive 18 therefore has, at all times, the same rotational speed as the planetary gear carrier 11. Preferably, however, the operative connection exists via a gear stage 19, so that a specific rotational speed ratio is adjusted between the planetary gear carrier 11 and the auxiliary drive 18. The auxiliary drive 18 has, for example, at least one auxiliary assembly 20 as well as a third drive assembly 21. The auxiliary assembly 20 and the third drive assembly 21 can be coupled rigidly to each other as well as to the planetary gear unit 9 or the planetary gear carrier 11. However, it can also be provided that the auxiliary assembly 20 or the third drive assembly 21 can be decoupled from the respective other assembly as well as from the planetary gear unit 9. To this end, it is possible to provide another shift clutch.

The drive device 1 further has a third shift clutch 22, by means of which the planetary gear carrier 11 can be fixed in relation to the ring gear 10. The second drive assembly 8 is connected electrically to an energy storage unit 23, which serves for intermediate storage of electric energy. The energy storage unit 23 is preferably designed as high-voltage energy storage unit, with the electric voltage of the energy storage unit 23 being preferably higher than that of an on-board energy storage unit 24, which can be provided with electric energy additionally for supplying energy to other components of the motor vehicle 1.

The third drive assembly 21, which likewise is present preferably in the form of an electric machine, is also connected to the energy storage unit 23. In the scope of the embodiment of the motor vehicle 1 presented here by way of example, it can be additionally provided that another drive assembly 25 is connected electrically to the additional drive device 6. The drive assembly 25 can be operatively connected directly or indirectly via a transmission 26 to the second axle 3 or to the wheels 4 thereof. By way of the drive assembly 25, the axle 3 or the wheels 4 thereof can be driven directly, so that the axle 3 exists as a driven axle.

Obviously, the design of the motor vehicle 1 illustrated here is to be understood as being solely by way of example. Thus, for example, the drive device 5 can be associated with the axle 3 and, conversely, the drive device 6 can be associated with the axle 2. In another design, the drive device 6 or the drive assembly 25, together with the transmission 26, are dispensed with. In this case, it can be provided that the drive device 5 is associated with a fourth drive assembly, which, for example, exists as another electric machine. The fourth drive assembly can be operatively connected to the planetary gear unit 9, in particular to the ring gear 10 or to the planetary gear carrier 11. The operative connection is thereby preferably designed to be rigid and permanent.

Such a design of the motor vehicle 1 or of the drive device 5 makes it possible to realize an extensive functionality for, at the same time, a very small installation space. This is achieved, in particular, by the association of the auxiliary drive 18 with the drive device 5 and the linkage thereof at the planetary gear unit 9. Obviously, besides the auxiliary assembly 20 of the auxiliary drive 18 illustrated here, at least one additional auxiliary assembly can be present, which preferably is associated likewise with the auxiliary drive 18 and consequently can be operatively connected likewise to the planetary gear unit 9 rigidly and permanently, in particular likewise to the planetary gear carrier 11. Furthermore, the additional auxiliary assembly can also be linked at the planetary gear unit 9 separately from the auxiliary drive 18, preferably likewise at the planetary gear carrier 11. This can be provided via another gear stage, which can have the same gear ratio as the gear stage 19 or can have gear ratios that differ from said gear ratio.

The auxiliary assembly 20 exists preferably as a turbomachine, for example, as an air-conditioner compressor of an air-conditioning system for an interior compartment of the motor vehicle 1. The additional auxiliary assembly can likewise exist as a turbomachine, for example as a vacuum pump for a braking power booster.

In order to improve further the efficiency of the drive device 5, it is possible, in addition, to provide a heat accumulator, in which heat produced from the first drive assembly 7 and/or from the second drive assembly 8 can be stored temporarily. This temporarily stored heat, for example, can be drawn upon for rapid heating of the first drive assembly 7 when a cold start occurs after the motor vehicle 1 has been parked, so that said drive assembly attains its operating temperature more rapidly. The heat temporarily stored in the heat accumulator can be drawn upon, in addition, for air conditioning of the interior compartment of the motor vehicle. The heat accumulator can be fundamentally designed in any way. Especially preferred, it exists as a latent heat accumulator; that is, it has a phase-change material.

The invention claimed is:

1. A drive device for a motor vehicle, comprising:
   a first drive assembly, a second drive assembly, and a planetary gear unit, via which the first drive assembly and the second drive assembly are operatively connected to a drivable axle of the motor vehicle, wherein the first drive assembly and the drivable axle are operatively connected to the planetary gear unit, and the second drive assembly as well as an auxiliary drive having an auxiliary assembly are operatively connected permanently to the planetary gear unit, with the auxiliary drive having a third drive assembly, which is coupled to the auxiliary assembly, wherein the third drive assembly is detachable from the auxiliary assembly,
   wherein the first drive assembly is operatively connected via a first shift clutch to the planetary gear unit, and the drivable axle is operatively connected via a second shift clutch to the planetary gear unit,
   wherein the first drive assembly is operatively connected via the first shift clutch to a ring gear of the planetary gear unit,
   wherein the drivable axle is operatively connected via the second shift clutch to a planetary gear carrier of the planetary gear unit, wherein at least one planetary gear is mounted rotatably at the planetary gear carrier, said planetary gear meshing, on the one hand, with the ring gear and, on the other hand, with a sun gear of the planetary gear unit, and wherein, by a third shift clutch, the planetary gear carrier is fixed in relation to the ring gear.

2. The drive device according to claim 1, wherein the second drive assembly is operatively connected to the sun gear of the planetary gear unit.

3. The drive device according to claim 1, wherein the auxiliary drive is operatively connected to the planetary gear carrier.

4. A motor vehicle having a drive device, comprising:
a first drive assembly, a second drive assembly, and a planetary gear unit, via which the first drive assembly and the second drive assembly are operatively connected to a drivable axle of the motor vehicle, wherein the first drive assembly and the drivable axle are operatively connected to the planetary gear unit and the second drive assembly as well as an auxiliary drive having an auxiliary assembly are operatively connected permanently to the planetary gear unit, wherein the auxiliary drive has a third drive assembly, which is coupled to the auxiliary assembly, wherein the third drive assembly is detachable from the auxiliary assembly, wherein the first drive assembly is operatively connected via a first shift clutch to the planetary gear unit, and the drivable axle is operatively connected via a second shift clutch to the planetary gear unit, wherein the first drive assembly is operatively connected via the first shift clutch to a ring gear of the planetary gear unit, wherein the drivable axle is operatively connected via the second shift clutch to a planetary gear carrier of the planetary gear unit, wherein at least one planetary gear is mounted rotatably at the planetary gear carrier, said planetary gear meshing, on the one hand, with the ring gear and, on the other hand, with a sun gear of the planetary gear unit, and wherein, by a third shift clutch, the planetary gear carrier is fixed in relation to the ring gear.

5. The motor vehicle according to claim 4, wherein another drive assembly is operatively connected to another drivable axle of the motor vehicle.

6. A method for operating a drive device, wherein the drive device comprises a first drive assembly, a second drive assembly, and a planetary gear unit, via which the first drive assembly and the second drive assembly are operatively connected to a drivable axle of the motor vehicle, comprising:

connecting operatively the first drive assembly and the drivable axle to the planetary gear unit and the second drive assembly, connecting operatively an auxiliary drive having an auxiliary assembly permanently to the planetary gear unit, wherein the auxiliary drive has a third drive assembly, and coupling the third drive assembly to the auxiliary assembly, wherein the third drive assembly is detachable from the auxiliary assembly, wherein the first drive assembly is operatively connected via a first shift clutch to the planetary gear unit, and the drivable axle is operatively connected via a second shift clutch to the planetary gear unit, wherein the first drive assembly is operatively connected via the first shift clutch to a ring gear of the planetary gear unit, wherein the drivable axle is operatively connected via the second shift clutch to a planetary gear carrier of the planetary gear unit, wherein at least one planetary gear is mounted rotatably at the planetary gear carrier, said planetary gear meshing, on the one hand, with the ring gear and, on the other hand, with a sun gear of the planetary gear unit, and wherein, by a third shift clutch, the planetary gear carrier is fixed in relation to the ring gear.

\* \* \* \* \*